United States Patent

[11] 3,620,742

| [72] | Inventors | Jozef Frans Willems<br>Wilrijk;<br>Robert Joseph Noe, Mortsel; Johannes<br>Josephus Vanheertum, Zandhoven; August<br>Jean Van Paesschen, Antwerp, all of<br>Belgium |
|---|---|---|
| [21] | Appl. No. | 793,881 |
| [22] | Filed | Jan. 24, 1969 |
| [45] | Patented | Nov. 16, 1971 |

[54] PHOTOCONDUCTIVE ELEMENT CONTAINING A DIHYDROQUINOLINE POLYMER
23 Claims, No Drawings

[52] U.S. Cl. .................................................. 96/1.6,
96/1.5 R, 252/501 R, 260/88.3 R
[51] Int. Cl. ................................................ G03g 5/00,
G03g 7/00
[50] Field of Search ........................................... 260/88.3,
800; 96/1.5, 1.6; 252/501

[56] References Cited
UNITED STATES PATENTS

| 2,713,047 | 7/1955 | Beaver et al. | 260/288 |
| 2,718,517 | 9/1955 | Harris | 260/88.3 |
| 2,849,452 | 8/1958 | Webb | 260/288 |
| 2,941,979 | 6/1960 | Pohle et al. | 260/45.8 |
| 3,196,180 | 7/1965 | Albert | 260/570.5 |
| 3,445,225 | 5/1969 | Brynko et al. | 96/1 |

*Primary Examiner*—George F. Lesmes
*Assistant Examiner*—M. R. Wittenberg
*Attorney*—William J. Daniel ABSTRACT: Electrophotographic materials wherein the photoconductive layer comprises a dihydroquinoline polymer.

PHOTOCONDUCTIVE ELEMENT CONTAINING A DIHYDROQUINOLINE POLYMER

The present invention relates to an electrophotographic material and to the application thereof in electrophotographic recording and reproduction of information.

Electrophotographic materials comprising a support and a photoconductive layer containing an inorganic or organic photoconductor, e.g. selenium, zinc oxide, anthracene, benzidine or a heterocyclic compound of a determined type and a polymeric substance with high resistivity as binding agent for the photoconductor are already known.

In more recent electrophotographic recording materials as described e.g. in the U.K. Pat. No. 964,871 filed Feb. 26, 1959 by Gevaert Photo Producten N.V. polymeric photoconductive substances are used in the recording element. By means of photoconductive polymeric substances very smooth and transparent photoconductive layers and even self-supporting sheets can be produced.

It has now been found that electrophotographic materials having favorable properties and being suited for application in widely varying electrophotographic reproduction methods are obtained, if in the photoconductive recording element a polymeric compound is used containing recurring groups corresponding to the following general formula:

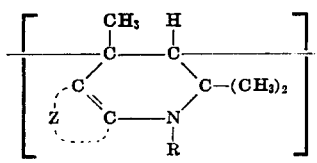

wherein:
R represents hydrogen or a group of the type that can be introduced into a secondary amine by reaction therewith of a compound containing R. Examples of such a group represented by R include a saturated or unsaturated, substituted or unsubstituted aliphatic or cycloaliphatic group, e.g. an alkyl group including a substituted alkyl group, an aralkyl group e.g. a benzyl group or a phenyl ethyl group, an allyl group, a cycloalkyl group e.g. a cyclohexyl group, an acyl group including a substituted acyl group, a carbamoyl group including a substituted carbamoyl group, an alkoxycarbonyl group including a substituted alkoxycarbonyl group or a thiocarbamoyl group including a substituted thiocarbamoyl group, and
Z represents the necessary atoms to complete an aromatic nucleus, e.g. an aromatic nucleus of the benzene series, including a substituted or fused aromatic nucleus, e.g. substituted with a nitro group or an alkoxy group such as an ethoxy group.

The term "polymer" includes homopolymers and copolymers. Thus the structural units of the above formula may form part of a copolymer containing structural units of known photoconductive polymers and/or structural units of nonphotoconductive polymers. The use of copolymers instead of homopolymers can be interesting for improving the mechanical strength of the recording layer and/or the solubility of the polymeric photoconductor in solvents particularly suited for use in the coating step.

In copolymers used according to the present invention and containing nonphotoconductive recurring units, the content of structural units as represented by the general formula described hereinbefore is preferably at least 50 mole percent.

A nonlimitative list of specific polymers containing or consisting of recurring groups corresponding to the above general formula, and which are suited for use in the manufacture of an electrophotographic material according to the present invention is represented hereinafter in table 1:

TABLE 1

1. 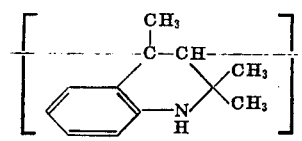

2. 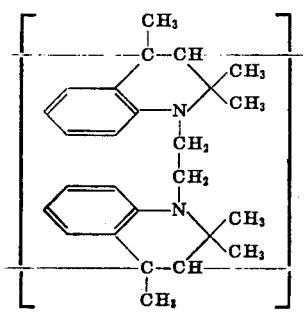

3. 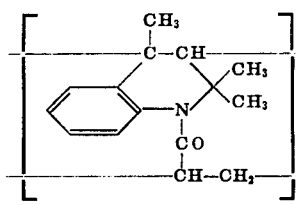

4. 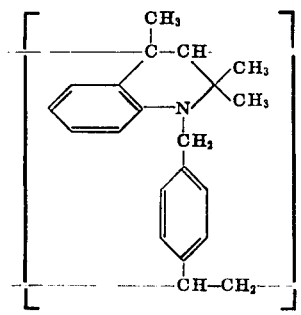

5. 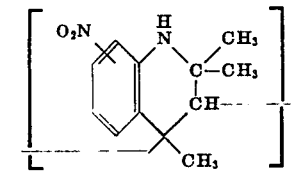

6. 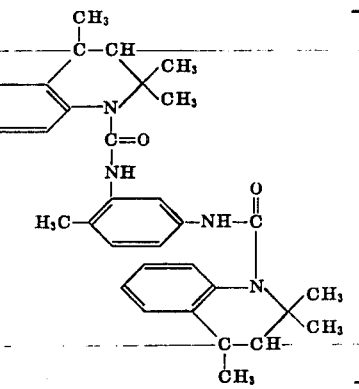

Polymers containing recurring units according to the general formula can be prepared by an addition polymerization known in the art by starting from a monomer having the following formula:

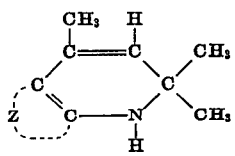

wherein Z has the meaning hereinbefore described.

For a detailed preparation of polymers used according to the present invention reference is made to the U.S. Pat. specification 2,718,517 and for the preparation of suitable monomers the British Pat. specification 764,957 is referred to, which specifications have to be read in conjunction herewith.

In the polymer thus obtained, the reactive hydrogen atom of the secondary amine group can be used for linking thereto a substituent which may be of polymeric nature itself, such as exemplified by the compounds 2, 3 and 4 of table 1. These polymeric substituents can be introduced e.g. by means of a Friedel-Crafts reaction. In this way products with an increased molecular weight and better layer-forming properties can be prepared.

The polymers used according to the present invention have not to be of a high molecular weight to obtain a practical useful photoconductivity. It has been experimentally found that polymers containing no more than four recurring units of the structure cited above are very interesting polymeric ingredients for the manufacture of photoconductive recording materials.

The polymeric substances suitable for being applied according to the present invention may be used alone or in combination with substances imparting desired chemical or physical properties to the recording element. So, these substances can be combined with other substances, which are either or not photoconductive and which exert an influence e.g. on the dark-resistivity, the dischargeability or conductivity of the recording layer by an exposure to electromagnetic radiation, or on the transparency or the quality of the final image, e.g. by counteracting the "fringe effect" as described in the U.K. Pat. No. specification 1,007,349 filed Oct. 12, 1961 by Gevaert Photo-Producten N.V.

The polymers used according to the present invention are preferably applied in admixture with (a) compound(s) that cause(s) an increase of the general sensitivity and/or of the sensitivity to electromagnetic rays of a particular part of the spectrum.

The fringe effect occurs when large electrostatically charged areas are developed and is characterized by the deposit of electrostatically charged substances only at the edges of said areas. In order to inhibit or to decrease said effect dispersable particles, e.g. inorganic pigment particles and organic water-insoluble particles are incorporated into the continuous polymeric phase of the recording layer.

Especially suitable for that purpose are zinc oxide pigment particles and a finely divided mineral product (average particle size: 5μ) known as MICRODOL (trade name of A.S. Norwegian Tale, Bergen, Norway for a mixture having the following composition (percent by weight):

| | |
|---|---|
| $CaCO_3$ | 54.34% |
| $MgCO_3$ | 45.15% |
| $Fe_2O_3$ | 0.04% |
| $Al_2O_3$ | 0.03% | and DRY-FLO (trade name of National Starch and Chemical Corporation, Plainsfield, N.J., U.S.A., for a starch ester containing hydrophobic groups).

These particles size between 1 and 5μ and are preferably used in an amount of 2.4 to 24 percent by weight in respect of the polymeric material contained in the recording layer. Optimal results are obtained with an amount of 6 percent by weight.

In particular cases, e.g. when the molecular weight of the photoconductive polymers used according to the present invention is not very high, in other words when the amount of recurring units is below 10, it is necessary to apply these polymers together with an optionally photoconductive binding agent or curing agent in order to form a recording layer of sufficient mechanical strength. A proper combination with selected binding agents and/or curing agents may result in an enhancement of the total sensitivity so that the binder or curing agent applied may be considered as a sensitizing agent. Preferably the recording layer contains at least 50 percent by weight of the photoconductive polymer applied according to the present invention.

In the following table 2 are given:
a. polymers preferably applied in this invention,
b. ratios by weight of these polymers to the preferably used photoconductive polymer FLECTOL H (trade name of Monsanto Chemical Company, St. Louis, Mo., U.S.A., for a poly (1,2-dihydro-2,2,4-trimethylquinoline) having an average amount of five structural units in the polymer chain,
c. the respective solvent or solvent mixture in which the combination of polymers is soluble.

TABLE 2

| Polymeric binding agent defined by its structural unit(s) | Ratio by weight | Solvent |
|---|---|---|
| (structure 1) | 2:1–6:1 | Methylene chloride. |
| (structure 2) | 2:1–6:1 | Do. |
| (structure 3) | | |

TABLE 2

| Polymeric binding agent defined by its structural unit(s) | Ratio by weight | Solvent |
|---|---|---|
| [structure: tetrachlorobisphenol A ether unit with –O–C₆H₂Cl₂–C(CH₃)₂–C₆H₂Cl₂–O–] | 12:1 | Do. |
| –[O–(CH₂)₆–OOC–(CH₂)₈–CO]– | 2:1–6:1 | Do. |
| [structure: –O–C₆H₄–C(CH₃)₂–C₆H₄–O–OC–CHCl–CHCl–CO–] | 2:1–6:1 | Do. |
| [structure: –OS₂–C₆H₄–C₆H₄–SO₂–] and [–O–C₆H₄–C(CH₃)₂–C₆H₄–O–] copolymer with phenanthrene-SO₂ unit | 2:1–6:1 | Do. |
| [structure: –OS₂–C₆H₄–SO₂–O–C₆H₄–C(CH₃)₂–C₆H₄–O–] | 2:1–6:1 | Do. |
| [structure: –OS₂–C₆H₄–C₆H₄–SO₂–O–C₆H₄–C(CH₃)₂–C₆H₄–O–] | 2:1–6:1 | Do. |
| [structure: –O–C₆H₄–C(CH₃)₂–C₆H₄–O–C(=O)–] (polycarbonate) | 6:1 | Do. |
| [structure: triazole ring with H₂N–N– and –C–(CH₂)₈–] | 6:1 | Do. |
| [structure: triazole ring with H₂N–N– and –C–CH₂–O–CH₂–] | | |
| –[CH₂–CH(Cl)]– | 2:1–6:1 | Methylene chloride/cyclohexanone (1:1) |
| –[CH₂–CH(C₆H₅)]– | 2:1–6:1 | Methylene chloride. |
| –[CH₂–CH(Cl)]– (75% by weight) and –[CH₂–CH(O–CH₂–CH(CH₃)₂)]– (25% by weight) | 2:1–6:1 | Do. |
| –[CH₂–CH(O–CO–CH₃)]– | 2:1–6:1 | Do. |

TABLE 2

| Polymeric binding agent defined by its structural unit(s) | Ratio by weight | Solvent |
|---|---|---|
| $\left[-CH_2-\underset{\underset{\underset{n-C_4H_{10}}{O}}{\overset{\overset{CH_3}{|}}{C}}}{\overset{|}{C}}-\right]$ | 2:1-6:1 | Do. |
| Copolymer of styrene, N-vinylcarbazole (80), and acrylonitrile (10) | 2:1-6:1 | Do. |
| Poly(N-carbazolylmethyl)-methyloxirane type unit | 2:1-6:1 | Do. |
| Copolymer of N-vinylcarbazole (80) and vinyl acetate (20) | 2:1-6:1 | Do. |
| Poly(methyl-1,3-dioxolane) type unit | 2:1-6:1 | Do. |
| Terpolymer: $-CH_2-CHCl-$ (91%) / $-CH_2-CH(OCOCH_3)-$ (3%) / $-CH_2-CH(OH)-$ (6%) | 10:4-10:7 | Methylene chloride/acetone (1:1) |
| Terpolymer: $-CH_2-CHCl-$ (85%) / vinyl acetate unit (14%) / maleic anhydride unit (1%) | 10:4-10:7 | Do. |
| Poly[(isobutyl)-1,3-dioxane] type unit | 10:4-10:7 | Methylene chloride/acetone/ethanol (1:1:1) |

The recurring units of the general formula may also be cross-linked, e.g. with a polyfunctional halogen compound that can be applied in a Friedel-Crafts reaction e.g. 1,2 dichloroethane or a polyepoxide or an organic polyisocyanate, e.g. 2,4-diisocyanatotoluene or 2-isocyanato-2-(p-isocyanatobenzyl)-propane.

The photoconductive polymeric compounds having recurring units according to the general formula can also be used in admixture with known photoconductive substances, e.g. sulfur, selenium, photoconductive oxides, sulfides, and selenides of zinc, cadmium, mercury, antimony, bismuth, and lead. They can be used in combination with organic monomeric photoconductors e.g. anthracene, anthraquinone, polymers containing N-vinylcarbazole recurring units and other known monomeric and polymeric organic photoconductors.

The inherent spectral sensitivity of the photoconductive used polymers according to the present invention is mainly situated in the near u.v. light range, i.e. in the range of 360 n.m. to 420 n.m. with a maximum near 380 n.m.

It is possible to increase or extend the spectral sensitivity of recording materials according to the present invention in different ways, e.g. by adding so called spectral sensitizing agents for the photoconductive substances contained in the recording element or by admixing to the photoconductive polymers other photoconductive substances whose inherent sensitivity for a particular part of the electromagnetic radiation spectrum is higher than that of said polymers.

So, according to a special embodiment of the present invention semitransparent recording layers are prepared, in which said polymeric photoconductive compounds are used in admixture with (an) inorganic photoconductive substance(s), especially photoconductive substances of the group of zinc oxide, photoconductive lead(II) oxide and photoconductive cadmium sulfide.

These semitransparent recording layers have a sensitivity to visible light that is markedly greater than that of the transparent recording layers containing only said photoconductive polymers.

Further it has been noticed that by means of said semitransparent recording layers visible images are produced having a flatter gradation than those obtained without any inorganic photoconductor, and that consequently the semitransparent recording layers offer an improved continuous-tone reproduction.

Even a very small amount of inorganic photoconductive compound, e.g. 1.5 g. of photoconductive zinc oxide in respect of 4 g. of poly(1,2-dihydro-2,2,4-trimethylquinoline) per sq. m. markedly increases the sensitivity of the recording layer to visible light. The dependency of the sensitivity to visible and ultraviolet light of a recording layer according to the present invention on the ratio by weight of poly-(1,2-dihydro-2,2,4-trimethylquinoline) to photoconductive zinc oxide is illustrated in detail in example 5.

The spectral sensitivity of both the organic polymeric photoconductor and the inorganic photoconductive substances can be extended to the visible part of the spectrum by means of a sensitizing dyestuff.

Suitable spectral sensitizing dyestuffs are among others organic dyestuffs, known as methine dyes, or xanthene dyes of which the phthaleins and rhodamines are subclasses. The term "methine dyes" includes mono- as well as polymethine dyes which dyes are known to those skilled in the art of the spectral sensitization of light-sensitive silver halide. Preferred methine dyes are of the cationic type and preferably contain one, three, five or seven carbon atoms in straight line in the methine part linking up two heterocyclic nitrogen containing nuclei of the methine dye. As preferred xanthene dyes rhodamine B (C.I. 45,170), rose bengale (C.I. 45,440) and fluoresceine (C.I. 45,350) are mentioned. The spectral sensitizing dyes are preferably added to the recording layer composition in a proportion of 0.1 to 5 percent by weight in respect of the photoconductive substance(s).

According to a further embodiment of the invention the recording material contains one or more substances that increase the photoconductivity of the recording material in the inherent spectral sensitivity range of the photoconductive polymers containing said recurring units. As already has been said the optical binding agent or curing agent can act as a sensitizing agent that enhances the total sensitivity of the recording element. In that respect are to be mentioned particularly the chlorine containing polymers of table 2 and curing agents containing epoxy groups such as the tetraglycidyl ether of tetraphenylene-ethane.

Further have to be mentioned electromagnetic radiation-sensitive diazonium salts which produce on exposure to electromagnetic radiation (a) radical (s) that irreversibly increase the electroconductivity of the recording layer. Such substances as well as details about their incorporation into a recording layer containing an organic polymeric photoconductive insulating substance are described in the U.S. Pat. No. 964,872 filed Apr. 22, 1959 by Gevaert Photo-Producten N.V. and the U.S. Pat. No. 3,113,022 of Paul Maria Cassiers, Jean Marie Nys, Jozef Frans Willems and Rene Maurice Hart, issued Dec. 3, 1963. A particularly suitable sensitivity-increasing diazonium compound is p-nitrobenzene-diazonium chloride. The diazonium compounds are preferably used in an amount of 0.01 percent to 10 percent by weight in respect of the photoconductive polymer(s).

Other additives well known in the art of preparing coatings for recording purposes may be used, e.g. matting agents, fluorescing compounds, phosphors, optical brightening agents, agents controlling the adhesive power of the recording layer, agents controlling the elasticity, the plasticity and the hardness of the recording layer, agents controlling the viscosity of the coating composition, antioxidants, gloss-improving agents, etc.

Transparent and semitransparent recording materials containing photoconductive polymeric compounds having structural units according to the general formula as described hereinbefore are suited for use in the reproduction of microfilm images. Microfilm images can be copied in contact or enlarged optically on recording materials according to the present invention. According to the type of development, the transparencies obtained (contact copies and enlargements) can serve as negative or positive intermediate print for further printing, e.g. on diazo type materials.

The semitransparent recording materials according to the present invention preferably have an optical density not larger than 0.30 towards visible light or the copying light used in the printing apparatus wherein it is used as intermediate print.

The thickness of the photoconductive layers is not critical but is open to choice within a wide range according to requirements in each individual case. Good results are attained with photoconductive layers of a thickness between 1 and 20 $\mu$ preferably between 3 and 10 $\mu$. Too thin layers do not have a sufficient insulating power, whereas too thick layers require extensive exposure times.

In the manufacture of widely applicable electrophotographic recording materials according to the present invention, a relatively conductive support for the recording layer is used, e.g. an electroconductive sheet or plate, or an insulting sheet or plate covered with an electroconductive interlayer. Under electroconductive plate or sheet is understood a plate or sheet whose electrical resistivity is smaller than that of the photoconductive layer i.e. in general smaller than $10^9$ ohm. cm. and preferably is at least 100 times smaller than that of the recording layer. Supports whose resistivity is not higher than $10^7$ ohm. cm. are preferred.

Suitable conductive plates are, e.g., plates of metals such as aluminum, zinc, copper, tin, iron, or lead.

Suitable electroconductive interlayers for insulating supports are, e.g., vacuum-coated metal layers such as silver or aluminum layers, transparent conductive polymer layers, e.g. applied from polymers containing quaternized nitrogen atoms, such as those described in the U.K. Pat. No. 950,960 filed Sept. 23, 1960 by Gevaert Photo-Producten N.V. or layers containing conductive particles, e.g. carbon black and metal particles dispersed in a binder. The binder used for said particles has a resistivity preferably lower than $10^6$ ohm. cm. A suitable binder for that purpose is gelatin.

It is possible to produce transparent photoconductive recording materials by applying the photoconductive polymers from a clear solution to a conductive transparent base or a transparent insulating base coated with an electroconductive transparent interlayer.

As transparent bases resin sheets having an optical density of not more than 0.10 are preferred, e.g., a sheet made of polyethylene terephthalate or cellulose triacetate. The conductive interlayer preferably consists of a metal coating, e.g., a vacuum-coated aluminum layer having an optical density of not more than 0.30 or of a conductive transparent polymer layer composed, e.g., of an organic polyionic polymer, e.g. a polymer containing quaternized nitrogen atoms such as a quaternized polyethylene-imine.

In reproduction techniques wherein the prints are to be produced on an opaque background preferably a paper sheet is used as support for the recording layer.

Paper sheets that have an insufficient electrical conductivity are coated or impregnated with substances enhancing their conductivity, e.g. by means of a conductive overcoat such as a metal sheet laminated thereto.

As substances suited for enhancing the conductivity of a paper sheet and which can be applied in the paper mass are particularly mentioned hydroscopic compounds and antistatic agents as described, e.g. in the U.K, Pat. No. 964,877 filed May 2, 1960 by Gevaert Photo-Producten N.V., and antistatic agents of polyionic type, e.g. CALGON CONDUCTIVE POLYMER 261 (registered trademark of Calgon Corporation, Inc., Pittsburgh, Pa., U.S.A. for a solution containing 39.1 percent by weight of active conductive solids and which contain a conductive polymer having recurring units of the following type:

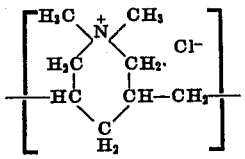

Paper sheets are preferably impermeabilized to organic solvents, e.g. by means of a water-soluble colloid or by strongly hydrating the cellulose fibers such as in the case of glassine paper.

Electrophotographic materials according to the present invention can be used in any of the different techniques known in recording with the aid of photoconductors. According to a preferred embodiment they can be used in a technique based on the discharge of an electrostatically charged recording layer by exposure to light. However, these electrophotographic materials can also be used in an electrophotographic recording technique, wherein the imagewise exposure precedes the charging step. Such technique is described in the U.K. Pat. No. 964,872 filed Apr. 22, 1959 by Gevaert Photo-Producten N.V.

Photoconductive recording materials prepared according to the present invention can be used in exposure units equipped with incandescent lamps, so that they need not be exposed with light rays rich in ultraviolet such as those emitted by a high-pressure mercury vapor bulb.

The electrostatic charging of photoconductive recording elements according to the present invention can be effected according to any method known in electrophotography, e.g., by friction with a smooth material, with a material possessing a high electric resistance, e.g., a cylinder coated with polystyrene, by corona discharge, by contact charge, or by discharge of a capacitor.

In order to obtain an electrostatic image, it is possible to effect the charging and exposure steps simultaneously and even to expose imagewise before charging since a conductivity image is formed, which is not immediately destroyed, especially if diazonium salts are used in the recording element.

The electrostatic latent image can be converted into a visible image either on the electrophotographic material wherein the latent image was formed, or on a material to which the electrostatic latent image was transferred, e.g., by application of the method described in the Belgian Pat. No. 529,234 filed May 29, 1954 by Batell Development Co.

The conversion of the original or transferred latent image into a visible image can occur according to one of the techniques known in electrophotography, wherein use is made of the electrostatic attraction or repulsion of finely divided colored substances, which, e.g., are present in a powder mixture, in an electrically insulating liquid (e.g., in the form of a suspension) or in a gas (e.g., in the form of an aerosol), or wherein electrostatic attraction is used for selectively wetting charged portions of the recording layer, as described in the U.K. Pat. No. 1,020,505 filed Nov. 8, 1961 and 1,033,419 filed Nov. 26, 1962 both by Gevaert Photo-Producten N.V.

When the sign of the charge of the developing powder or developing liquid is properly chosen, either a negative or a positive print can be obtained from any original. If both printing material and developing powder or developing liquid bear the same sign of charge, the powder only adheres to the discharged areas so that a negative print is obtained. If the signs of the recording material and of the developing powder or developing liquid differ, a positive print is obtained.

In addition to development according to the methods generally known in electrophotography, other techniques can successfully be used too, e.g., the methods, according to Belgian Pat. Nos. 579,725 filed June 16, 1959 and 585,224 filed Dec. 2, 1959 both by Gevaert Photo-Producten N.V.

If a colored powder is used for making visible the latent image, the visible image obtained can, if necessary, be fixed according to one of the methods known in electrophotography, e.g., by heating, or it can be transferred to another support, e.g., according to the method described in the U.K. Pat. No. 658,699 filed Apr. 14, 1949 by Batell Memorial Institute, and fixed thereon.

The photoconductive polymers can also be applied in a thermoplastic recording process to form a ripple-image as described, e.g., in the U.K. Pat. No. 964,881 filed May 17, 1960 by Gevaert Photo-Producten N.V.

Evidently, the present invention by no means is limited to one or other particular embodiment as regards the use of new electrophotographic materials, exposure technique, charging method, transfer (if any), developing method, and fixation. The method as well as the materials used in these methods can be adapted to the necessities.

Electrophotographic materials according to the present invention can be employed in reproduction techniques, wherein different kinds of electromagnetic radiations are used, e.g., visible light, u.v. light, X-rays and λ-rays.

In order to prepare an electrophotographic material according to the present invention various techniques may be applied.

In practice, the polymeric substances involved, either alone or together with other additives such as those described above, preferably are first dissolved or dispersed in a suitable organic solvent such as a ketone, e.g., acetone, chlorinated hydrocarbons, e.g., methylene chloride, and aliphatic esters, e.g., ethyl acetate, or in a mixture of two or more of such solvents. The solution or dispersion thus obtained is uniformly spread on a surface of a suitable support, e.g., by centrifuging, spraying, brushing, or coating. Thereupon the layer formed is dried in such a way that a uniform photoconductive layer is formed on the surface of the support. It is to be noted, however, that the invention is not limited to the procedure of using the polymeric substances involved in the form of prepolymerized substances; for example monomeric compounds or blends of monomeric compounds and polymeric substances may be applied to the surface to be coated, and partly or wholly be polymerized in situ according to a suitable method. As monomeric compound the compound with following structure is particularly mentioned:

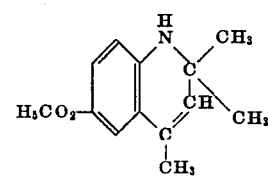

The following examples illustrate the present invention.

Example 1

To a glassine paper were applied with a reverse roller coater a mixture of 50 g. of copoly(vinyl chloride/vinyl acetate/vinyl alcohol) (91/3/6 ratio by weight) and 100 g. of FLECTOL H (trade name for a low molecular weight (average amount of recurring units being five) poly(1,2-dihydro-2,2,4-trimethylquinoline) having a specific gravity 1.12 at 25° C., and in intrinsic viscosity [$\eta$]0.04 dl./g. measured in methylene chloride at 25° C., manufactured by Monsanto Chemical Company, St. Louis, Mo., U.S.A.,) dissolved in 750 cc. of acetone and 250 cc. of butyl acetate. The mixture was applied at a rate of 1 liter per 18 sq.m.

After a negative corona charging with a potential difference of −6,000 v. between the corona wires and the ground, the charged recording layer was contact-exposed for 10 sec. through a positive transparency of a test chart with incandescent bulbs which together represent 100 watt and are placed at a distance of 30 cm.

After the exposure the development was carried out with a triboelectrically charged positive toner on the base of 3 parts by weight of pitch, 4 parts by weight of colophonium and 3 parts by weight of carbon black.

A contrasty positive copy of the transparency was obtained wherein the large image areas showed the so-called "fringe-effect."

Example 2

In a mixture of 120 g. of FLECTOL H (trade name) dissolved in 300 cc. of methylene chloride and 300 ml. of butylacetate and 20 g. of PIOLOFORM B.W. (a poly(vinyl-n-butyral) sold by Wacker Chemie G.m.b.H. Munchen, W. Germany) in 400 ml. of ethanol were dispersed 5 g. of DRY-FLO, starch ester containing hydrophobic groups, marketed by National Starch and Chemical Corporation, Plainsfield, N.J., U.S.A., having an average grain size of 5 micron.

The mixture obtained was coated at a rate of 1 liter per 18 sq.m. with a reverse roller coater onto a glassine paper base.

The dried layer was charged with a corona of −6,000 v. and exposed in a microfilm enlarging equipment through a positive microfilm.

The exposure lasted 10 sec. and was carried out with a tungsten lamp of 100 watt placed at such a distance of the recording layer that an enlargement of 10 × could be obtained.

The exposed recording layer was developed according to the magnetic brush technique with a carrier toner mixture of which the toner is the same as described in example 1 but is mixed with 200 parts of iron powder.

A contrasty black image wherein the large image parts were equally dense developed was obtained.

Example 3

100 g. of compound 3 were dissolved in 500 cc. of methylene chloride and mixed with 25 g. of poly(vinyl-n-butyral) dissolved in 500 cc. of a solvent mixture consisting of acetone and ethanol (50:50).

The coating and further processing were the same as described in example 1. A copy with same image quality as the one obtained according to the procedure of example 1 was obtained.

Example 4

The procedure of example 3 is repeated except for the use of compound 3 of table 1 which is replaced in the same amount by compound 1.

Example 5

To a polyethylene terephthalate support of 100 μ a conductive transparent coating was applied from an aqueous solution of gelatin and CALGON CONDUCTIVE POLYMER 261 (trade name) in a weight ratio of 2:1. The coating was carried out in such a way that the dried coating contained 2 g. of gelatin per sq.m. The electrical resistivity of the coating was 1×10$^8$ ohm. per sq.cm.

An electrophotographic recording material (A) was prepared by coating onto said conductive layer a composition containing:

| | |
|---|---|
| poly(1,2-dihydro-2,2,4-trimethylquinoline) | 6 g. |
| copoly(butadiene/styrene)(15/85 by weight) | 3 g. |
| methylene chloride | 100 cc. |

The dried layer contained 3 g. of poly(1,2-dihydro-2,2,4-trimethylquinoline) per sq.m.

An electrophotographic recording material (B) was prepared by coating onto said conductive layer a composition containing:

| | |
|---|---|
| poly(1,2-dihydro-2,2,4-trimethylquinoline) | 6 g. |
| copoly(butadiene/styrene)(15/85 by weight) | 3 g. |
| photoconductive zinc oxide prepared by the oxidation of zinc vapor and having an average grain size of 0.17 μ | 4 g. |
| methylene chloride | 100 cc. |

The dried layer contained 3 g. of poly(1,2-dihydro-2,2,4-trimethylquinoline) per sq.m.

Each of the coated samples (A) and (B) were negatively charged with a negative corona having a potential difference of −6,000 v. between the corona wires and the ground.

Each of the charged samples (A) and (B) was divided in two equal parts viz. A$_1$ and A$_2$, and B$_1$ and B$_2$.

The samples A$_1$ and B$_1$ were contact-exposed for a same period of time at a distance of 25 cm. through a step wedge having 0.30 log exposure increments by means of an OSRAM L 40 watt A 70 fluorescent tube having an emission maximum at 365 n.m.

The samples A$_2$ and B$_2$ were contact-exposed for a same period of time at a distance of 25 cm. through a step wedge having 0.30 log exposure increments by means of a tungsten filament lamp of 15 watt/130 volt having a color temperature of 2,600° K.

The latent wedge images were electrophoretically developed by means of an electrophoretic developer obtained by diluting the concentrated developer composition described hereinafter in a volume ratio of 15/1,000 by means of ISOPAR H (trade name for an isoparaffinic hydrocarbon mixture having a boiling range of 177°-188° C. sold by Esso Belgium, N.V., Antwerp, Belgium):

| | |
|---|---|
| carbon black (average particle size: 20 n.m.) | 30 g. |
| zinc monotridecyl phosphate as dispersing agent | 1.5 g. |
| ISOPAR H (trade name) | 750 ml. |
| resin solution prepared as described hereinafter | 150 g. |

The resin binder solution was prepared by heating 500 g. of ALKYDAL L 67 (trade name of Farbenfabriken Bayer A.G., Leverkusen, W. Germany, for a linseed oil modified (67 percent by weight alkyd resin) and 500 cc. of white spirit containing 11 percent by weight of aromatic compounds at 60° C. till a clear solution was obtained, and subsequent cooling.

From the obtained wedge prints could be concluded that the sensitivity of the material B for electromagnetic radiation emitted by the said fluorescent tube is 20 times as large as the sensitivity of material A, and that the sensitivity of material B for electromagnetic radiation emitted by the tungsten filament lamp was 64 times as large as that of material A.

Example 6

To the conductive layer of the polyethylene terephthalate support described in example 5 a photoconductive layer was applied from a coating composition containing a poly(1,2-dihydro-2,2,4-trimethylquinoline) -trimethylquinoline) having an average amount of five recurring units and SILICON HARZ UD 160 (trade name of Farbenfabriken Bayer A.G. Leverkusen, W. Germany, for an organic silicon oxide polymeric binding agent) in a weight ration of 1:1. The dry photoconductive layer of the obtained recording material (A) contained 3 g. of poly(1,2-dihydro-2,2,4-trimethylquinoline) per sq.m.

To the conductive layer of the polyethylene support described in example 5 a photoconductive layer was applied from a coating composition containing a poly(1,2-dihydro-2,2,4-trimethylquinoline) having an average amount of five recurring units per molecule and EPON 1031 (trade name of Shell Chemical Co., U.S.A.) for the tetraglycidyl ether of tetraphenylene ethane) in a weight ratio of 1:1. The dry photoconductive layer of the obtained recording material (B) contained 3 g. of poly(1,2-dihydro-2,2,4-trimethylquinoline) per sq.m.

The processing of both of the recording materials (A) and (B) was carried out as described in example 5.

For the electromagnetic radiation emitted by the OSRAM HPN lamp the material (B) possessed a sensitivity that was 30 times as large as that of material (A).

A material (C) that had the same composition as material (A), except that in the recording layer 5.3 g. of p-nitrobenzene diazonium chloride were used per 100 g. of poly(1,2-dihydro-2,2,4-trimethylquinoline), possessed a sensitivity for the electromagnetic radiation emitted by the said OSRAM HPN lamp that was five times as high as that of material (A).

Example 7

To the conductive layer of the polyethylene support described in example 5 a photoconductive layer was applied from a coating composition containing the following ingredients:

| | |
|---|---|
| poly(1,2-dihydro-2,2,4-trimethylquinoline) | 8.5 g. |
| copoly(vinyl chloride/vinyl acetate/maleic anhydride)(85/14/1 mol %) | 5 g. |
| Rhodamine B (C.I. 45,170) | 0.04 g. |
| methylene chloride | 100 cc. |

The dried recording layer contained 3 g. of poly(1,2-dihydro-2,2,4-trimethylquinoline) per sq.m.

The sensitivity for the electromagnetic radiation emitted by a tungsten filament lamp having a color temperature of 2,600° C. of the recording material containing rhodamine B as spectral sensitizing dye and a same recording material containing no rhodamine B was compared and it was found that the material containing rhodamine B was 10 times more sensitive than the nondye-sensitized material.

A same sensitizing result was obtained when in the recording layer a cationic methine dye of the following structure was used:

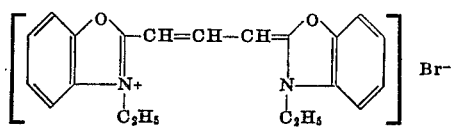

in a same amount as rhodamine B.

Example 8

To the conductive layer of the polyethylene terephthalate support described in example 5 a photoconductive layer was applied from a 20 percent by weight solution of FLECTOL H (trade name) and EPON 1031 (trade name) in a weight ratio of 1:1 in methylene chloride.

The dried photoconductive layer contained 3 g. of FLECTOL H (trade name) per sq.m.

After charging as described in example 5 the recording material was contact-exposed for 7 sec. through a 35 mm. microfilm negative of a typed text.

For the exposure an OSRAM L 40 watt A 70 fluorescent tube was used placed at a distance of 25 cm. from the recording material.

This exposed material was then developed as described in example 5.

A microfilm copy having the same image values as the microfilm negative was obtained.

Same results were obtained by replacing FLECTOL H (trade name) by a same amount of compound 2 or compound 5 of table 1.

Compound 2 was prepared by nitration of FLECTOL H, (trade name).

Compound 5 was prepared as follows:

To 100 cc. of liquid ammonia containing 1.95 g. of sodamide in dispersed state 8.6 g. of FLECTOL H (trade name) dissolved in 50 cc. of anhydrous tetrahydrofuran were added dropwise. Thereupon the ammonia was allowed to slowly evaporate and the obtained solution was heated for 15 minutes at reflux temperature. After cooling of the solution till room temperature a solution of 1.1 cc. of 1,2-dibromoethane in 50 cc. of anhydrous tetrahydrofuran was added. There was a small rise in temperature and after 30 min. 10 cc. of anhydrous tetrahydrofuran containing 0.5 cc. of 1,2-dibromoethane were added, whereupon the reaction mixture was heated at 50° C. while stirring for 30 minutes.

After cooling, the polymer was separated by pouring the solution into a large volume of water. The product separated as an oil but solidified within 24 hr. at room temperature. The solidified product was filtered with suction. Yield: 7 g. The specific viscosity at 25° C. of a 0.5 percent solution in benzene was 0.020.

The titration result of the final product with 0.1 n perchloric acid in acetic acid was 5.06 milliequivalent per gram, whereas the titration result of the starting polymer was 5.6 milliequivalent per gram.

We claim:

1. A photosensitive recording material comprising a conductive support carrying a photoconductive layer, which contains a photoconductive polymeric substance comprising recurring groups corresponding to the general formula:

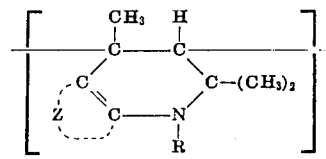

wherein:

R represents hydrogen or a group that can be introduced into a secondary amine by reaction therewith of a compound containing R, and Z represents the necessary atoms to complete an aromatic nucleus including a substituted aromatic nucleus.

2. A recording material according to claim 1, wherein R represents hydrogen or a saturated or unsaturated, aliphatic or cycloaliphatic group, an acyl group, a carbamoyl group, an alkoxycarbonyl group, a thiocarbamoyl group, and Z represents the necessary atoms to close a nucleus of the benzene series.

3. A recording material according to claim 1, wherein said conductive support has a resistivity at least $10^2$ as low as that of the recording element itself.

4. A recording material according to claim 3, wherein the support is a paper support.

5. A recording material according to claim 3, wherein the support is an insulating transparent resin film coated with a transparent electroconductive interlayer.

6. A recording material according to claim 5, wherein said interlayer contains a polyionic resin.

7. A recording material according to claim 1, wherein the recording element is a recording layer containing particles decreasing the fringe effect.

8. A recording material according to claim 7, wherein the said particles have a grain size of 1 to 5 micron and are present in the recording layer in an amount of 2.4 to 24 percent by weight in respect of the polymeric material.

9. A recording material according to claim 1, wherein the photoconductive polymer is used in admixture with a polymeric binding agent and/or curing agent.

10. A recording material according to claim 1, wherein the polymeric substance is used in admixture with a substance increasing the photosensitivity of the recording element.

11. A recording material according to claim 1, wherein the polymeric substance is used in admixture with a spectral sensitizing dye.

12. A recording material according to claim 1, wherein the polymeric substance is used in admixture with at least one inorganic or organic photoconductive substance.

13. A recording material according to claim 12, wherein the polymeric substance is used in admixture with a photoconductive compound selected from the group of photoconductive selenium, and the photoconductive oxides, sulfides, and selenides of zinc, cadmium, mercury, antimony, bismuth and lead.

14. A recording material according to the claim 13, wherein the photoconductive recording element has an optical density not higher than 0.30 for visible light or copying light.

15. A recording material according to claim 1, wherein the recording element is spectrally sensitized by means of a xanthene dye and/or a methine dye.

16. A recording material according to claim 1, wherein the polymeric substance is used in admixture with a binding agent and/or a curing agent increasing the photoconductivity of the recording agent.

17. A recording material according to claim 16, wherein the polymeric substance is used in admixture with the tetraglycidyl ether of tetraphenylene-ethane.

18. A recording material according to claim 1, wherein the polymeric substance is used in admixture with a diazonium compound.

19. A recording material according to claim 18, wherein the diazonium compound is p-nitrobenzene-diazonium chloride.

20. A recording material according to claim 1, wherein the polymeric substance comprises recurring units having one of the following structural formula:

TABLE 1

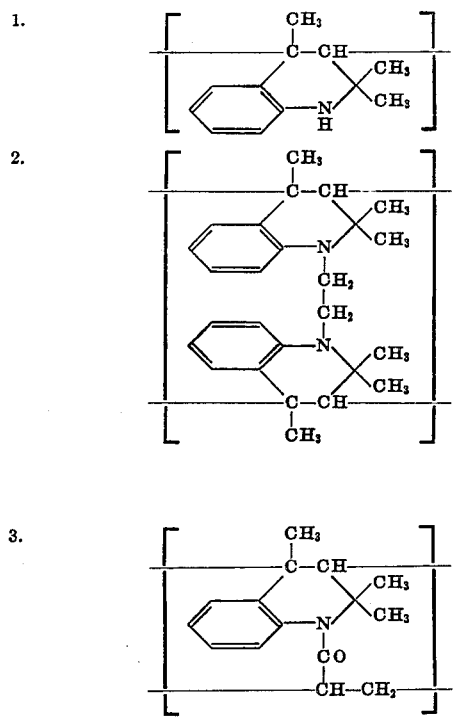

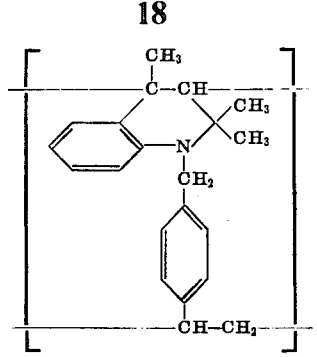

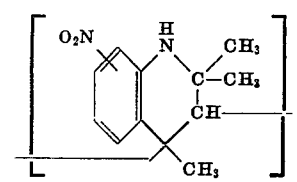

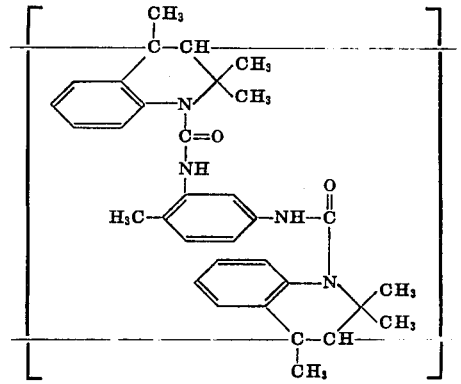

21. A photographic reproduction process, which comprises the steps of (1) electrostatically charging a photoconductive insulating layer containing a photoconductive polymer comprising recurring groups corresponding to the following general formula:

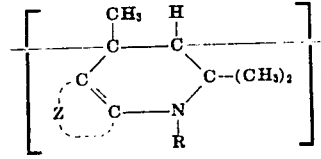

wherein:
R represents hydrogen or a group that can be introduced into a secondary amine by reaction therewith of a compound containing R, and
Z represents the necessary atoms to complete an aromatic nucleus;
(2) information-wise exposing said layer to electromagnetic radiation, and (3) developing the resulting electrostatic charge image with an electrostatically attractable substance.

22. The recording material of claim 1 wherein said polymeric substance contains up to about 10 of said recurring units.

23. The recording material of claim 22 wherein the polymer contains not more than about four of said recurring units.

* * * * *

UNITED STATES PATENT OFFICE
CERTIFICATE OF CORRECTION

Patent No. 3,620,742          Dated November 16, 1971

Inventor(s) Jozef Frans WILLEMS et al

It is certified that error appears in the above-identified patent and that said Letters Patent are hereby corrected as shown below:

In the Heading of the Patent insert:

-- [73]   Assignee        Gevaert-Agfa N.V.
                                      Mortsel, Belgium

[32]   Priority        January 26, 1968
        [33]                    Great Britain
        [31]                    4276/68          --.

Column 17, claim 20, delete the heading "TABLE 1".

Signed and sealed this 23rd day of May 1972.

(SEAL)
Attest:

EDWARD M. FLETCHER, JR.                ROBERT GOTTSCHALK
Attesting Officer                         Commissioner of Patents